US007993257B2

(12) United States Patent
Simonini et al.

(10) Patent No.: US 7,993,257 B2
(45) Date of Patent: Aug. 9, 2011

(54) SECURING MECHANISM, PARTICULARLY FOR BLOOD SEPARATION CENTRIFUGES AND THE LIKE

(75) Inventors: Gianpaolo Simonini, Reggio Emilia (IT); Ivo Panzani, Mirandola (IT); Andrea Galavotti, Mirandola (IT)

(73) Assignee: Sorin Group Italia S.r.l. (IT)

( * ) Notice: Subject to any disclaimer, the term of this patent is extended or adjusted under 35 U.S.C. 154(b) by 245 days.

(21) Appl. No.: 12/472,825

(22) Filed: May 27, 2009

(65) Prior Publication Data
US 2009/0305863 A1 Dec. 10, 2009

(30) Foreign Application Priority Data

Jun. 10, 2008 (EP) ..................................... 08157932

(51) Int. Cl.
*B04B 7/06* (2006.01)
*B04B 15/00* (2006.01)
(52) U.S. Cl. ............................. 494/12; 494/84; 279/131
(58) Field of Classification Search ..................... 494/12, 494/41, 43, 84, 85; 279/129–131; 269/224, 269/254 R, 254 CS, 254 MW
See application file for complete search history.

(56) References Cited

U.S. PATENT DOCUMENTS

| 1,385,306 | A | * | 7/1921 | Clayton ............................. 57/76 |
| 2,835,517 | A | * | 5/1958 | Beerli ............................. 403/328 |
| 3,317,127 | A | * | 5/1967 | Cole ................................ 494/43 |
| 3,409,213 | A | * | 11/1968 | Latham, Jr. ...................... 494/41 |
| 3,565,330 | A | * | 2/1971 | Latham, Jr. ...................... 494/41 |
| 3,581,981 | A | * | 6/1971 | Latham, Jr. ...................... 494/14 |
| 3,785,549 | A | * | 1/1974 | Latham, Jr. ...................... 494/43 |
| 4,140,268 | A | * | 2/1979 | Lacour ............................ 494/41 |
| 4,718,888 | A | * | 1/1988 | Darnell ........................... 494/85 |
| 4,795,419 | A | * | 1/1989 | Yawn et al. ...................... 494/84 |
| 4,838,849 | A | * | 6/1989 | Calari ............................. 494/85 |
| 4,889,524 | A | * | 12/1989 | Fell et al. ........................ 494/12 |
| 5,060,957 | A | * | 10/1991 | Stolzenberg et al. ......... 279/129 |

(Continued)

FOREIGN PATENT DOCUMENTS

EP 2138237 A1 * 12/2009

(Continued)

OTHER PUBLICATIONS

Nov. 19, 2008 International Search Report for European Application No. 08157932.8 (4 pages).

*Primary Examiner* — Charles E Cooley
(74) *Attorney, Agent, or Firm* — Faegre & Benson LLP

(57) ABSTRACT

A chuck for rotating around a rotation axis $X_A$ a centrifugal separation bowl secured thereto includes a vat-shaped body for receiving a lower end portion of the separation bowl secured therein with a peripheral rim of the chuck surrounding an outer flank of the separation bowl. The chuck includes a plurality of clutching systems to cooperate with the flank of the separation bowl in securing it to the chuck. The clutching systems include a channel formed in the chuck body with an arcuate path in the peripheral rim of the chuck body. A chain of translatory bodies arranged within the channel includes a proximal translatory body and a distal translatory body in the chain, whereby a force acting on the proximal body and directed outwardly of the rotation axis $X_A$ is transmitted through the chain of translatory bodies to the distal translatory body to urge it inwardly towards the rotation axis $X_A$ to clutch the outer flank of the separation bowl, whereby the separation bowl is secured to the rotary chuck.

17 Claims, 2 Drawing Sheets

U.S. PATENT DOCUMENTS

| | | | | |
|---|---|---|---|---|
| 5,062,826 A | * | 11/1991 | Mantovani et al. | 279/129 |
| 5,104,372 A | * | 4/1992 | Rossetto | 494/38 |
| 5,288,088 A | * | 2/1994 | Santandrea et al. | 279/24 |
| 5,312,319 A | * | 5/1994 | Salter | 494/12 |
| 5,387,174 A | * | 2/1995 | Rochat | 494/10 |
| 5,505,683 A | * | 4/1996 | Geringer et al. | 494/12 |
| 5,591,113 A | * | 1/1997 | Darnell et al. | 494/12 |
| 5,658,231 A | * | 8/1997 | Schmitt et al. | 494/12 |
| 5,851,169 A | * | 12/1998 | Meresz et al. | 494/12 |
| 5,873,810 A | * | 2/1999 | Holm et al. | 494/12 |
| 5,964,690 A | * | 10/1999 | Wright et al. | 494/12 |
| 7,452,322 B2 | * | 11/2008 | Headley et al. | 494/41 |
| 2007/0213191 A1 | * | 9/2007 | Chammas | 494/41 |
| 2009/0305863 A1 | * | 12/2009 | Simonini et al. | 494/46 |

FOREIGN PATENT DOCUMENTS

| | | | | |
|---|---|---|---|---|
| JP | 09164343 A | * | 6/1997 | |
| JP | 2005-81087 | * | 3/2005 | |
| JP | 2009291335 A | * | 12/2009 | |
| JP | 2010042398 A | * | 2/2010 | |

* cited by examiner

SECURING MECHANISM, PARTICULARLY FOR BLOOD SEPARATION CENTRIFUGES AND THE LIKE

The application from which this application claims foreign priority, European Application No. 08157932.8, filed Jun. 10, 2008, entitled "A securing mechanism, particularly for blood separation centrifuges and the like", is hereby incorporated by reference.

BACKGROUND OF THE INVENTION

This disclosure relates to centrifuges for the separation of components of blood and similar fluids.

In an embodiment, this disclosure relates to a mechanism for securing a separation bowl to a mechanical chuck. Conventional blood processing devices exploit large centrifugal forces to separate the different components of whole blood by relying on the different densities of the different blood components, which can be separated and collected.

These blood processing devices may include a bowl, into which whole blood is inserted, a chuck, to which the bowl is secured, and a centrifuge motor, operably connected to the chuck. The centrifuge motor drives the chuck and the bowl secured thereto at very high speeds, thus allowing the separation of the different phases of blood.

A factor in the design of these devices is ensuring connection of the separation bowl to the chuck in order to avoid the undesired disengagement of the bowl from the chuck during operation with consequent damage to the bowl, the chuck and loss of blood product.

Different mechanisms for securing a separation bowl to a mechanical chuck have been developed over the years with the aim of allowing easy insertion and removal of the bowl from the chuck, while firmly securing the separation bowl to the chuck during operation.

For instance, U.S. Pat. No. 5,658,231 discloses a centrifugal chuck comprising a chuck housing provided with a plurality of slots, equally spaced along the circumference of the chuck, wherein gripping fingers are received. The gripping fingers are pivotally mounted around the outer perimeter of the chuck housing by means of pins and extend in a generally axial direction parallel to the axis of rotation of the centrifuge. Each gripping finger includes a tip portion, adapted to receive the base portion of a separation bowl thus securing the bowl to the chuck.

Another example of a mechanism for securing a separation bowl to a chuck is represented by a device developed by Sorin Group Italia S.r.l., and currently available under the trade designation ELECTA from Sorin Group Italia S.r.l. In such an arrangement, the bowl is permanently coupled with a cylindrical hollow body; this is adapted for coupling with a chuck (having an external diameter slightly smaller than the internal diameter of the hollow body) once the bowl is mounted thereon. The locking mechanism to secure the separation bowl to the chuck includes a spring-pin (i.e. a spring pushing radially a small ball or sphere) which cooperates with a slot provided in the internal surface of the hollow body firmly fixing the bowl bottom onto the chuck. The chuck includes a further safety locking system comprised of three locks urged radially outwardly by respective springs engaged in respective holes formed in the hollow body.

Despite the existence of mechanisms able to safely connect a separation bowl to a chuck, the inventors have noted that certain prior art clutching systems are not exempt from significant drawbacks. For instance, in the arrangement of U.S. Pat. No. 5,658,231, already cited, blood and dirt can easily enter the chuck and block it, with the ensuing risk that the bowl may detach from the chuck when turning at high speed.

The need is thus still felt for mechanisms which may allow simpler manufacturing and facilitate mounting the separation bowl on the chuck and removing the separation bowl from the chuck while ensuring improved protection of the internal volume of the chuck.

SUMMARY OF THE INVENTION

The invention provides a chuck for rotating around a rotation axis $X_A$ a centrifugal separation bowl. The chuck comprises a vat-shaped body for receiving a lower end portion of the separation bowl, the lower end portion secured in the chuck with a peripheral rim of the chuck surrounding an outer flank of the separation bowl. The chuck includes at least one clutching system to cooperate with the flank of the separation bowl in securing the separation bowl to the chuck. The clutching system comprises:

(i) a channel formed in the chuck body, the channel having an arcuate path within the peripheral rim of the chuck; and (ii) a chain of translatory bodies arranged within the channel, the chain of translatory bodies including a proximal translatory body in the chain and a distal translatory body in the chain, whereby a force acting on the proximal body and directed outwardly of the rotation axis $X_A$ is transmitted through the chain of translatory bodies to the distal translatory body in the chain to urge the distal translatory body inwardly towards the rotation axis $X_A$ to clutch the outer flank of the separation bowl, whereby the separation bowl is secured to the rotary chuck.

In an embodiment, the present invention is directed to a mechanism for securing a separation bowl to a mechanical chuck, the mechanism including plural translatory bodies clutching systems spaced around the circumference of the chuck.

BRIEF DESCRIPTION OF THE DRAWINGS

The invention will now be described, by way of example only, with reference to the annexed drawings.

FIG. 1 includes the separation bowl.

FIG. 2 does not include the separation bowl.

DETAILED DESCRIPTION OF THE INVENTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
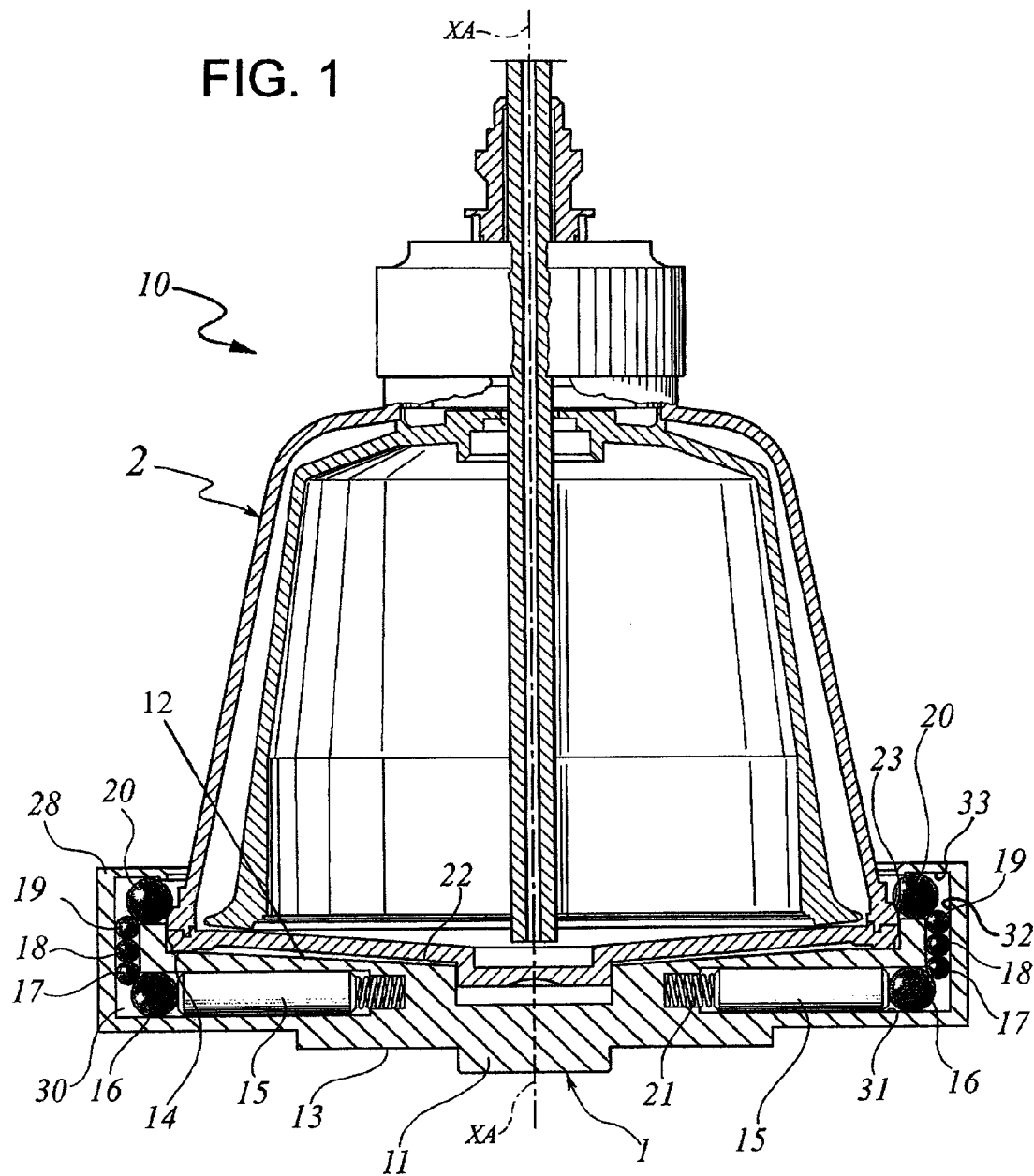
FIG. 1 is an axial cross-sectional view across an exemplary embodiment of a mechanism for securing a separation bowl to a mechanical chuck.
Figure 2:
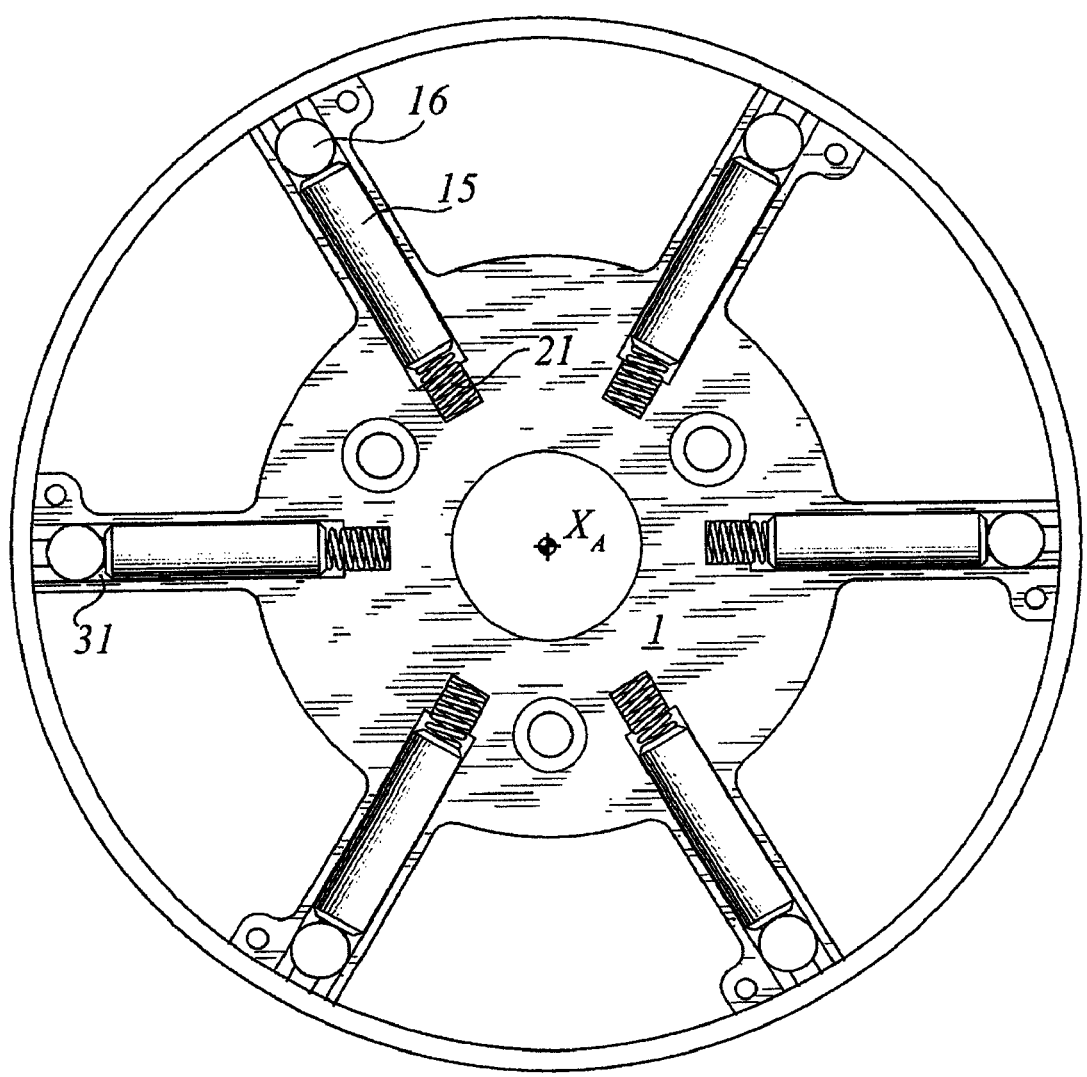
FIG. 2 is a plan view of an exemplary embodiment of the arrangement of FIG. 1.

In the embodiment shown in FIGS. 1 and 2, a centrifuge 10 for separating the various components of whole blood includes a motor-driven chuck 1 for securing a closed cone-shaped (bell-shaped) separation bowl 2 whereby the chuck 1 and the separation bowl 2 secured thereto may rotate around a main (centrifuge) axis $X_A$. The bowl 2 is provided with one or more inlet port(s) for the whole blood to be treated and one or more outlet port(s) through which separated blood components are extracted.

In the embodiment shown, the bowl 2 is provided with a convex (e.g. cone-shaped) lower end portion 22, surrounded by an outer cone-shaped flank 23, adapted to be coupled to the chuck 1.

In the exemplary embodiment shown, the chuck 1 comprises a chuck body 11 configured as a vat-shaped body with an internal bottom surface 12 and an external lower surface 13 facing the centrifuge motor. In the operating conditions of this embodiment, the internal bottom surface 12 and the external lower surface 13 will thus face the lower end portion 22 of the bowl 2 and the centrifuge motor, respectively.

In the exemplary embodiment shown, the chuck body 11 will thus be able to receive therein the lower end portion 22 of the separation bowl 2 with a peripheral rim 28 of the chuck surrounding the outer flank 23 of the separation bowl 2.

The arrangement of parts described in the foregoing is per se conventional in the art and does not require to be further detailed herein.

In an embodiment, the peripheral rim 28 has a continuous structure (e.g. is comprised of a complete ring-shaped or toroidal body). In an embodiment, the peripheral rim 28 has a discontinuous structure (e.g. include a plurality of spaced arc-shaped segments intended to co-operate as the fingers of a hand to clutch the separation bowl).

In an embodiment, the chuck body 11 is provided with a plurality of clutching systems to secure the bowl 2 to the chuck 1. These clutching systems may be angularly, equally spaced at 60° around the circumference of the chuck to secure the bowl 2 to the chuck 1 around the axis $X_A$. In an embodiment, six clutching systems are preferably present.

An embodiment of the arrangement described herein provides for plural clutching systems being provided each including:

(i) a channel 30 formed in the chuck body 11, wherein the channel may have an arcuate path within the peripheral rim 28, (ii) a chain of translatory bodies such as e.g. spherical balls arranged within the channel 30, wherein the chain of translatory bodies may include a proximal translatory body 16 in the chain and a distal translatory body 20 in the chain with one or more intermediate translatory bodies 17, 18, 19, and (iii) a centrifugal mass 15, which may exert, under the action of a bias spring 21 and/or due to centrifuge action during rotation of the chuck 1 around the axis $X_A$ (as better detailed in the following) a force on the proximal body 16 directed outwardly of the axis $(X_A)$.

The radial force exerted outwardly on the proximal body 16 may be transmitted via the intermediate translatory body or bodies 17, 18, 19 in the chain to the distal translatory body 20; the distal translatory body 20 will thus be urged towards the rotary axis $X_A$ to clutch the outer flank 23 of the separation bowl 2 and secure the bowl to the rotary chuck 1.

In an embodiment, the outer bottom flank of the separation bowl has a conical convex shape opening out towards the chuck 1. The inward radial force exerted by the distal translatory body 20 will thus develop a "vertical" component (i.e. a component in a direction parallel to the axis $X_A$) which will keep the bowl 2 firmly attached to the chuck 1.

In the exemplary embodiment illustrated, the channel 30 formed in the chuck body 11 exhibits a C-shaped path (i.e., more generally, an arc-shaped or arcuate path) including:

(i) a proximal portion 31 extending radially of the axis $X_A$ for receiving therein one or more translatory bodies including the proximal translatory body 16; in the embodiment shown, the proximal portion 31 also receives the centrifugal mass 15;

(ii) an intermediate portion 32 for receiving a plurality intermediate translatory bodies, such as three translatory bodies 17, 18, 19 between the proximal 16 and the distal 20 translatory bodies in the chain, wherein the intermediate portion 32 of the channel extends in the direction of the axis $X_A$; and (iii) a distal portion 33 for receiving therein one or more translatory bodies including the distal translatory body 20 in the chain, wherein this distal portion extends radially of the axis $X_A$.

As used herein, the channel 30 and the portions 31, 32, 33 thereof "receiving" therein (i.e. housing) the rotary bodies 16 to 20 (and the mass 15) means that the translatory bodies are confined within the channel(s) with the capability of at least slightly moving along the channel in order to perform the thrust (i.e. force) transmission effect from the proximal body 16 (i.e. from the centrifugal mass 15/spring 21) to the distal body 20 (i.e. to the flank 23 of the bowl 2).

In the embodiment illustrated, the translatory bodies are balls such as steel balls, but other translatory bodies able to transmit properly the movement and the force with low friction, such as e.g. rollers, may be used.

In an embodiment, the joint mass of the bodies housed in the proximal channel portion 31 (i.e., in the exemplary embodiment shown, the proximal translatory body 16 and the centrifugal mass 15 acting thereon) is larger than the joint mass of the bodies housed in the distal channel portion 33 (i.e., in the exemplary embodiment shown, the distal translatory body 20). Such a difference in the masses can be obtained by adjusting the masses and/or the number of the individual bodies involved. For instance, the number of translatory bodies in the proximal portion 31 of the channel 30 may be higher than the number of translatory bodies in distal portion 33 of the channel 30. Also, it will be appreciated that the proximal translatory body 16 may incorporate the role of the centrifugal mass 15, thus making it unnecessary to provide the centrifugal mass 15 as a separate component.

During operation of the centrifuge 10 at low rotational speeds of the chuck, the centrifugal force generated by the mass 15 acting on the proximal translatory body 16 in the horizontal channel 31 will be negligible. In these conditions, the elastic element (e.g. a spring) 21 will exert on the proximal translatory body 16 an elastic force directed outwardly, transmitted to the distal translatory body 20 via the intermediate translatory bodies 17, 18, 19, which will ensure that the distal translatory body 20 is pressed against the cone-shaped lower flank 23 of the bowl, with a force sufficient to keep the bowl 2 firmly attached to the chuck 1.

As the rotational speed of the chuck increases, the spring force exerted by the elastic member 21 on the proximal translatory body 16 will be gradually supplemented by the centrifugal force exerted by the mass 15, which will become largely predominant at high rotational speed.

The centrifugal force developed by the mass of bodies in the proximal portion 31 of the channel 30 will prevail against the centrifugal force developed by the mass of bodies in the distal portion 33 of the channel 30, causing the distal translatory body 20 to be firmly urged against the outer flank 23 of the bowl 2 to secure the bowl 2 against the chuck, with a force that increases as the rotational speed of the chuck increases.

A convex conical sloped shape of the flank 23 at the lower end 22 of the bowl 2 will transform the inwardly directed force exerted by the distal translatory body 20 into a strong downward component i.e. a strong force in the direction of the axis $X_A$ directed towards the chuck 1 which will keep the bowl 2 firmly attached to the chuck 1.

Thus, the bowl 2 is kept fixed, firmly in place and attached to the chuck 1, whatever the chuck rotational speed is.

Coupling the bowl 2 to the (stationary) chuck 1 will merely involve sliding the lower portion of the bowl 2 into the vat-like cavity of the chuck by first causing the distal bodies 20 of the securing mechanisms to first spread apart against the moderate reaction force generated by the springs 21 and then snap-engage against the flank 23 again under the elastic force generated by the springs 21. A complementary movement to release the bowl from the elastic reaction exerted against the flank 23 by the translatory bodies 20 under the action of the springs 21 will permit easy disengagement of the bowl 2 from the chuck 1.

The chuck structure of the invention allows simpler manufacturing and assembly operations, since no levers or hinges are employed. Moreover, the chuck structure of the invention provides higher protection against an adverse environment preventing contamination from blood and dirt. In fact, when the bowl 2 is disengaged from the chuck 1, the distal translatory bodies 20 will hermetically close the channels 30 and seal the internal parts of the chuck to the outer environment.

Without prejudice to the underlying principles of the invention, the details and the embodiments may vary, even appreciably, with reference to what has been described by way of example only, without departing from the scope of the invention as defined by the annexed claims.

What is claimed is:

1. A chuck for rotating around a rotation axis $X_A$ a centrifugal separation bowl, the chuck comprising a vat-shaped body for receiving a lower end portion of the separation bowl, the lower end portion secured in the chuck with a peripheral rim of the chuck surrounding an outer flank of the separation bowl, wherein the chuck includes at least one clutching system to cooperate with the flank of the separation bowl in securing the separation bowl to the chuck, wherein the clutching system comprises:
   (i) a channel formed in the chuck body, the channel having an arcuate path within the peripheral rim of the chuck; and
   (ii) a chain of translatory bodies arranged within the channel, the chain of translatory bodies including a proximal translatory body in the chain and a distal translatory body in the chain, whereby a force acting on the proximal body and directed outwardly of the rotation axis $X_A$ is transmitted through the chain of translatory bodies to the distal translatory body in the chain to urge the distal translatory body inwardly towards the rotation axis $X_A$ to clutch the outer flank of the separation bowl, whereby the separation bowl is secured to the rotary chuck.

2. The chuck of claim 1, comprising an elastic element exerting on the proximal body at least part of the force directed outwardly of the rotation axis $X_A$.

3. The chuck of claim 1, comprising a centrifugal mass to exert on the proximal body, during rotation around the rotation axis $X_A$, at least part of the force directed outwardly of the rotation axis $X_A$.

4. The chuck of claim 3, wherein the centrifugal mass is a body distinct from the proximal body.

5. The chuck of claim 4, wherein the centrifugal mass is a rod slidably arranged in a radial bore in the chuck.

6. The chuck of claim 1, comprising both a centrifugal mass and an elastic element biasing the centrifugal mass, the centrifugal mass and the elastic element to exert on the proximal body, during rotation around the rotation axis $X_A$, respective components of the force directed outwardly of the rotation axis $X_A$.

7. The chuck of claim 6, wherein the centrifugal mass is a body distinct from the proximal body.

8. The chuck of claim 7, wherein the centrifugal mass is a rod slidably arranged in a radial bore in the chuck.

9. The chuck of claim 1, wherein the channel formed in the chuck body and having an arcuate path comprises:
   (i) a proximal portion extending radially of the axis $X_A$ for receiving the proximal translatory body; and
   (ii) an intermediate portion for receiving translatory bodies in the chain intermediate between the proximal and the distal translatory bodies in the chain, wherein the intermediate portion of the channel extends in the direction of the rotation axis $X_A$; and
   (iii) a distal portion extending radially of the rotation axis $X_A$ for receiving the distal translatory body in the chain.

10. The chuck of claim 9, wherein the proximal portion and the distal portion of the channel receive therein bodies exposed to centrifugal force during rotation around the rotation axis $X_A$, and wherein the joint mass of the bodies exposed to centrifugal force arranged in the proximal portion of the channel is higher than the joint mass of the bodies exposed to centrifugal force arranged in the distal portion of the channel.

11. The chuck of claim 10, wherein the bodies in the proximal portion of the channel are a translatory body and a centrifugal mass.

12. The chuck of claim 1, comprising a plurality of clutching systems angularly equally spaced around the rotation axis $X_A$.

13. The chuck of claim 12, comprising six of the clutching systems.

14. The chuck of claim 1, wherein the peripheral rim of the chuck is continuous.

15. The chuck of claim 1, wherein the translatory bodies are in the form of balls.

16. A combination of the chuck of claim 1 and a centrifugal separation bowl.

17. The combination of claim 16, wherein an outer flank of the separation bowl has a convex conical shape opening out towards the chuck.

* * * * *